Sept. 13, 1949. W. C. ARNDT 2,481,710
FISH LURE
Filed June 21, 1945

INVENTOR
WALTER C. ARNDT

BY

ATTORNEYS

Patented Sept. 13, 1949

2,481,710

UNITED STATES PATENT OFFICE 2,481,710

FISH LURE

Walter C. Arndt, Oshkosh, Wis.

Application June 21, 1945, Serial No. 600,707

1 Claim. (Cl. 43—42.5)

My invention refers to fish lures and it has for its primary object to provide a body of metal or other suitable material, having a front offset head and complementary upwardly extended tapered fins fanning out from the tail of the body. The elongated one-piece bait so constructed is of the streamline nature and it presents a minimum wind resistance in casting. When drawn through the water it develops a wiggle movement at the head end and the fins, in addition, will cause said bait to wobble with a rolling motion, which, in practical tests, have proved its "catch" value, due to the lifelike attractive movements. Hence, the bait is not only effective but it is of a one-piece simple construction, whereby it may be manufactured at a minimum cost of production.

It is understood that the one-piece body is provided with means for attaching gang hooks to the tail end thereof, or a single weedless hook directly to the body.

With the above and other minor objects in view, my invention consists in certain peculiarities of construction and combination of parts as will be fully set forth hereinafter with reference to the accompanying drawing and subsequently claimed.

Figure 1:
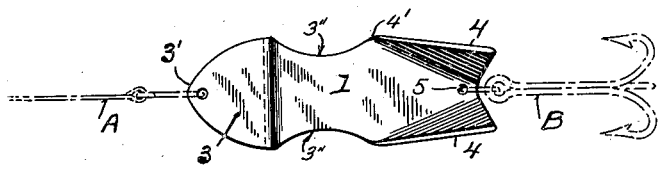
Figure 1 represents a plan view of a lure embodying the features of my invention.
Figure 2:
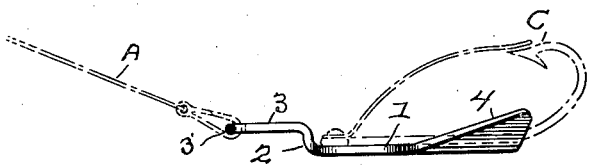
Figure 2 is a side elevation of the same.

Referring by characters to the drawings, 1 indicates a thin flat elongated one-piece metallic body. The front end of the body is provided with an upwardly extended offset baffle face 2, which face merges into a flat head 3. The head parallels the flat body and is preferably rounded at its edges to form a pointed apertured nose 3'. As indicated in Figures 1 and 2 of the drawings, the nose aperture is for the purpose of attaching a leader A, indicated in dotted lines.

Figure 3:
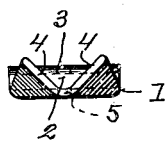
Figure 3 is a rear end view of the lure, particularly illustrating the upwardly flared complementary rolling fins.
Figure 3:

The rear or tail portion of the body is folded upwardly to form complementary fins 4—4, the same, as shown in Figure 3, being positioned at a suitable angle and said fins are forwardly tapered in a downward direction merging into the edges of the body. The tail is provided with an aperture 5 for anchoring a suitable gang of hooks B, indicated in dotted lines in Figure 1.

The edge of the body, between the ends of the wings and offset flat head portion thereof, is preferably curved inwardly to form an intermediate waistline 3", as shown. It should be understood that the ends of the vertically disposed baffle plate 2 and the forward end of the upwardly extended fins 4 are positioned in longitudinal alignment. Hence, when the lure travels through the water currents, they will spill from the ends of the baffle plate and be directed upon the fins to materially increase the wobble movement of the lure, keeping in mind the curved waistlines are clear of the direction of the water currents. The lure, in instances where weed conditions exist, is provided with a standard weedless hook C, which is riveted to the central portion of the body rearward of the head thereof.

Attention is particularly directed to the fact that the streamlined flow from the ends of the baffle plate is aligned with the hip corners 4' of the body, from which hip corners the fins rise and gradually incline rearward. Between the hip corners and the baffle ends the body is intermediately curved to develop a narrow waistline 3" to clear the back flow of water directed to the fins, whereby a balance of the wobble is maintained and developed by the fins to avoid resistance and render the lure uniform in its action.

While I have illustrated one exemplification of my invention and described the same minutely as to detail, it is understood that I may vary such details, as interpreted by the claim.

I claim:

In a fish lure comprising a one-piece body, having a transversely disposed offset baffle face extending upwardly from the front end of the body, having a flat head extending forwardly from the upper edge of the said baffle in alignment with the body but upon a higher horizontal plane than said body, the body having a transversely disposed hip portion corresponding in width to the baffle face, the edges of the body from the hip portion to said baffle face being inwardly curved to develop a narrow waistline relative to the general width of the aforesaid body and from the hip portion thereof the tail end of the body being folded upwardly to a position for the reception of hooks, and the upper portions of said folds constituting trailing fins having their upper rear edge portion above the plane of the flat head, whereby the flow of water from the ends of the baffle face is directed against the fins and divided in its flow to increase the wobble of the bait.

WALTER C. ARNDT.

REFERENCES CITED

The following references are of record in the file of this patent:

UNITED STATES PATENTS

| Number | Name | Date |
|---|---|---|
| 2,238,604 | Sabin | Apr. 15, 1941 |
| 2,254,981 | Sisco | Sept. 2, 1941 |